United States Patent
Kuster et al.

(10) Patent No.: US 7,006,450 B2
(45) Date of Patent: Feb. 28, 2006

(54) SWITCH SELECTION MECHANISM FOR A SWITCH POOL IN A WIRELESS TELECOMMUNICATIONS NETWORK

(75) Inventors: Jo Kuster, Prosper, TX (US); Klaus Turina, Backnang (DE); Dimitrios Papadimitriou, Dallas, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 799 days.

(21) Appl. No.: 09/907,238

(22) Filed: Jul. 17, 2001

(65) Prior Publication Data

US 2003/0016644 A1 Jan. 23, 2003

(51) Int. Cl.
*H04J 1/16* (2006.01)
*H04L 12/28* (2006.01)
(52) U.S. Cl. .................. 370/252; 370/400; 370/410
(58) Field of Classification Search ............. 370/252, 370/400, 410, 503, 516
See application file for complete search history.

(56) References Cited

U.S. PATENT DOCUMENTS

| | | | | |
|---|---|---|---|---|
| 5,966,662 A | * | 10/1999 | Murto | 455/458 |
| 6,097,951 A | * | 8/2000 | Ernam et al. | 455/433 |
| 6,129,604 A | * | 10/2000 | Maveddat et al. | 455/453 |
| 6,505,050 B1 | * | 1/2003 | Brudos et al. | 455/458 |
| 6,553,227 B1 | * | 4/2003 | Ho et al. | 455/433 |
| 6,615,041 B1 | * | 9/2003 | Adamany et al. | 455/432.1 |
| 6,697,620 B1 | * | 2/2004 | Lamb et al. | 455/432.1 |

* cited by examiner

*Primary Examiner*—Andy Lee

(57) ABSTRACT

Disclosed are systems and methods for associating querying switches with responsive access nodes in a telecommunications network (10) having a switch pool (18). The methods include techniques for assigning a switch (12) of the switch pool (18) as a handling switch for queries received from the plurality of access nodes (14). The handling switch directs queries to respective target access nodes (14). The handling switch also receives responses from target access nodes. Techniques are provided for reassignment of the handling switch from among switches (12) of the switch pool (18) on the basis of various criteria such as, for example load or transaction count. Examples of the invention in the context of a Global System for Mobile Communications (GSM) network (10) having a Mobile Switching Center (MSC) pool (18) are described.

17 Claims, 5 Drawing Sheets

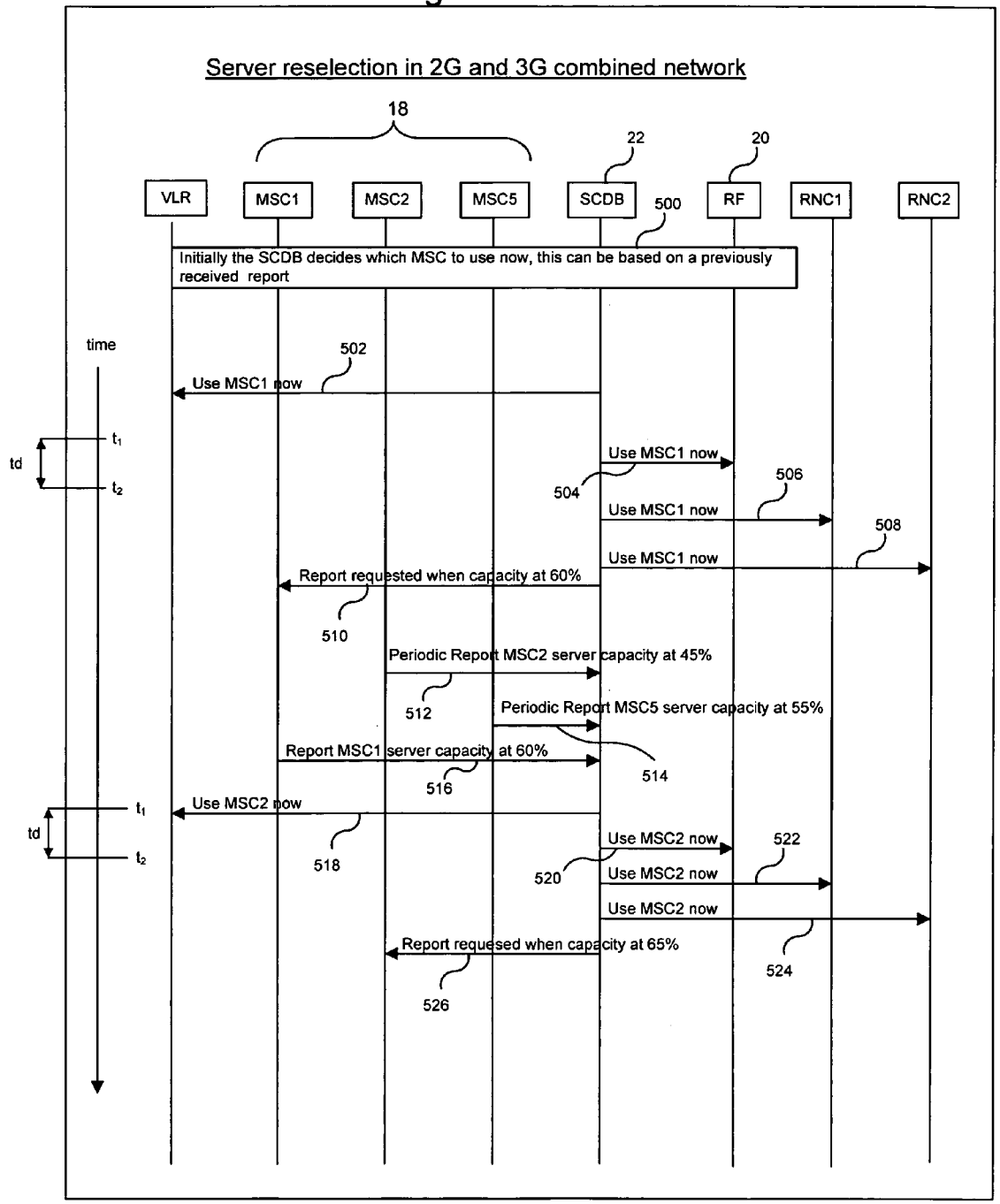

SWITCH SELECTION MECHANISM FOR A SWITCH POOL IN A WIRELESS TELECOMMUNICATIONS NETWORK

TECHNICAL FIELD

The invention relates in general to telecommunications networks and more particularly to connections between switches and access nodes in a wireless network. More particularly, the invention relates to providing systems and methods for associating switches and access nodes in a wireless telecommunications network using a mobile switch pool.

BACKGROUND OF THE INVENTION

The increasing demand for wireless telecommunication services has resulted in the growth of many wireless telecommunications systems and an increase in the number of roaming wireless subscribers. Some efforts that have been implemented to accommodate and distribute the increased traffic load propose that the traffic load be distributed among a number of switches, such as Mobile Switching Centers (MSC), such that they constitute a switch pool, or MSC pool, for the network. Such a switch pool offers many advantages to both subscriber and network service provider in the form of more efficient utilization of network resources. Advantages realized by the use of the switch pool include load sharing of network components and increased capacity and/or coverage without the addition of more switching elements.

There are, however, known limitations and disadvantages of a conventional switch pool. The most flexible methods of load distribution in telecommunications networks using such pools function on a per transaction basis. This technique is adequate for connection-oriented messages, e.g., where a connection is being established with the initial message, and the switch pool which handles the initial message controls the resulting call. Such systems and methods suffer from inefficiency, however, in the handling a paging query and corresponding paging response.

In particular, the paging request is a connectionless message. That is, no connection is established between the querying switch and the responding access node such that it may be difficult to identify the querying switch in the switch pool. Should a different switch be selected during the time interval preceding a response, there is no ready mechanism for associating the response to the paging switch. In some circumstances, the probability can be small that the same switch that sent the paging query would be the same switch selected to receive the response. Therefore, the switch that receives the paging response must check to see which switch handled the paging query and send the paging response to that particular switch. Once the connection is established, this routing procedure is also used for any messages subsequent to the paging response. Using the resources of both switches is an inefficient use of capacity.

Due to the above-referenced and additional problems in efficiently routing messages in a telecommunications network using a switch pool, improved methods and systems for selecting switches from within the switch pool would provide significant advantages by allowing the switch initiating a paging request to be re-selected for the paging response as well. Such systems and methods would substantially eliminate the redundant use of resources in a telecommunications network for most mobile-terminating calls. More efficient use of switches in a switch pool would produce numerous advantages including allowing for increased telecommunications traffic in the network and a reduction of the switch hardware required for a given level of traffic. Some of the advantages of the invention are summarized below.

SUMMARY OF THE INVENTION

The invention provides systems and methods for associating queries and responses in a telecommunications network including a switch pool and a plurality of access nodes in communication with the switch pool.

A method of the invention provides for associating querying switches with responsive access nodes. The method includes steps for assigning a switch of the switch pool as a handling switch for queries received from the plurality of access nodes. The handling switch directs queries to respective target access nodes. The handling switch also receives responses from target access nodes. Techniques are provided for reassignment of the handling switch from among switches of the switch pool.

According to one aspect of the invention, the handling switch is assigned on the basis of transaction count.

According to another aspect of the invention, the handling switch is assigned on the basis of network load.

According to yet another aspect of the invention, the handling switch is assigned on the basis of time.

According to still another aspect of the invention, a method is employed to associate a requesting Mobile Switching Center (MSC) with a responding Base Switching Center (BSC) in a Global System for Mobile Communications (GSM) including an MSC pool and a number of BSCS in communication with the MSC pool. This is accomplished using steps assigning a selected MSC of the MSC pool as a handling MSC for requests received from the individual BSCs. The handling MSC directs the requests to respective target BSCs. Techniques are provided for reassignment of a different MSC of the MSC pool as the handling MSC based on parameters such as time, load, or transaction count.

According to an additional aspect of the invention, a switch system in a telecommunications network has a switch pool of numerous individual switches. The access nodes of the network are coupled to the switches of the switch pool. A routing function of the invention is adapted to associate querying switches with responding access nodes.

According to still another aspect of the invention, a switch system is provided with a switch selection database for contributing to the association of a querying switch with a responding access node.

The invention, in its various embodiments, provides technical advantages useful in the arts. For example, the use of the invention increases the likelihood that queries and responses in networks having a switch pool will be handled by the same switch, resulting in increased efficiency and decreased load on switch components of the network. Additional advantages include improved load distribution in the network, and better use of network capacity. Further advantages will become apparent to those skilled in the arts upon review of the following description and claims.

BRIEF DESCRIPTION OF THE DRAWINGS

The above advantages, as well as specific embodiments of the present invention, will be more clearly understood from consideration of the following descriptions in connection with accompanying drawings in which:

FIG. 5 is a process diagram of alternative method steps of the invention practiced in a combination 2G–3G mobile telecommunications network.

Corresponding numerals and symbols in the various figures refer to corresponding parts unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. It should be understood that the invention may be practiced with telecommunications networks, switches, and access nodes of various types and in various configurations. Some features of embodiments shown and discussed are simplified or exaggerated for illustrating the principles of the invention.

Figure 1:
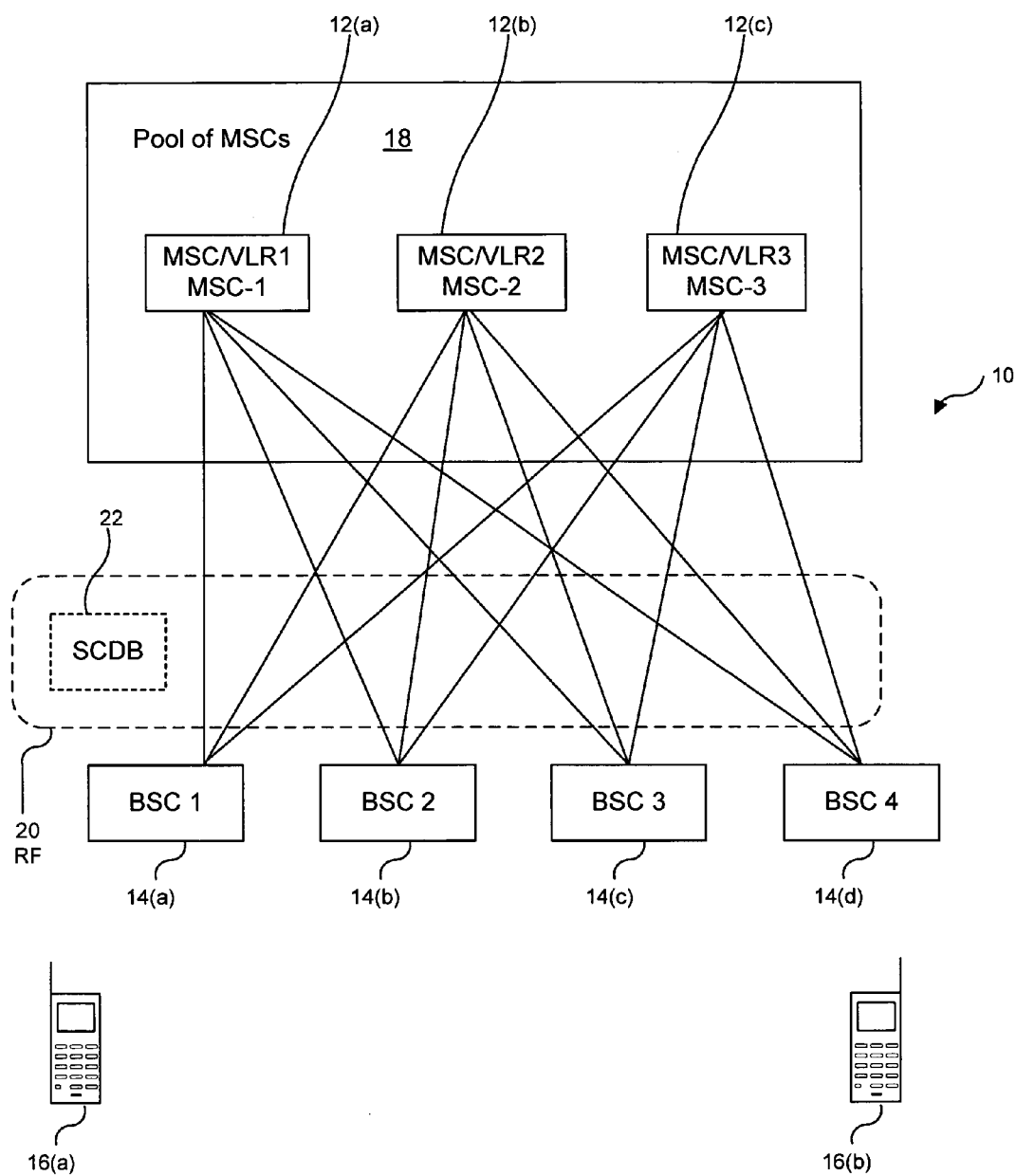
FIG. 1 is a block diagram of an example telecommunications network having a switch pool illustrating a suitable context for the use of the invention.

FIG. 1 is a block diagram illustrating the context of the invention in a telecommunications network including a switch pool and a number of access nodes connected with the switch pool. In this example, a Global System for Mobile communications (GSM) network 10 is shown. In the GSM network 10, multiple switches, or Mobile Switching Centers (MSCs), 12(a–c), are connected to numerous access nodes, or Base Station Controllers (BSCs) 14(a–d). The BSCs 14(a–d) are capable of connecting, ultimately, to Mobile Stations (MSs), e.g. 16(a), 16(b). A switch pool 18 is made up of a group of switches 12(a–c) of the network 10. Typically, all switches 12(a–c) in a network 10 participate in a switch pool 18. A Routing Function (RF) 20 is implemented between the switches 12(a–c) and access nodes 14(a–d) of the network 10 in order to facilitate connections and load distribution.

The network 10 shown is, of course, abbreviated in order to simplify the discussion of the use of the invention. It will be understood by those skilled in the arts that a telecommunications network would ordinarily contain many additional switches and access nodes, as well as additional components not essential to the understanding of the invention and therefore not shown, e.g. Base Transceiver Stations (BTSs). It should also be understood that although the network 10 is described in the context of GSM, the invention may be practiced with other telecommunications network topologies such as, for example, wireless networks using Code Division Multiple Access (CDMA), Enhanced Data for GSM Evolution (EDGE), and Digital Advanced Mobile Phone Service (DAMPS).

With continued reference to FIG. 1, the following example will aid in understanding the invention. Assuming, for the sake of example, that a particular MS 16(a) seeks to place a call terminating at a distant MS 16(b), the following sequence would occur. The originating MS 16(a) sends a message to a Base Transceiver Station (not shown) which, in turn, communicates with the applicable BSC as is known in the arts, e.g. BSC 14(a) to initiate setup of the call. In this example, MSC2 12(b) receives a request, routed through the network 10, for a call to terminating MS 16(b). MSC2 12(b) then initiates a paging request toward MS 16(b). Upon receipt of the paging query, the terminating MS 16(b) sends a paging response to its serving BTS (not shown) and ultimately to a BSC, such as BSC 14(d). The paging response is then routed by the Routing Function (RF) 20 to the MSC which initiated the paging request, in this case, MSC 12(b). It can be seen in FIG. 1, however, that as a result of the switch pool arrangement 18, BSC 14(c) has access to all MSCs 12(a–c) of the network 10. It should be clear that because of the switch pool 18 between BSCs and MSCs, there are many alternative routes by which a paging response may reach a querying switch. Thus, the pooling of MSCs introduces a problem which did not exist in the art prior to the implementation of MSC pooling, by eliminating the dedicated connections by which each BSC was previously connected to only one MSC.

With the above example of the operation of a switch pool 18 and the accompanying FIG. 1 and description to provide context, it should be understood by those skilled in the arts that according to the invention, the RF 20 is adapted, preferably in conjunction with a Selection Control Database (SCDB) 22, to select the same MSC 12(n) for both a query and its response in most cases.

Figure 2:
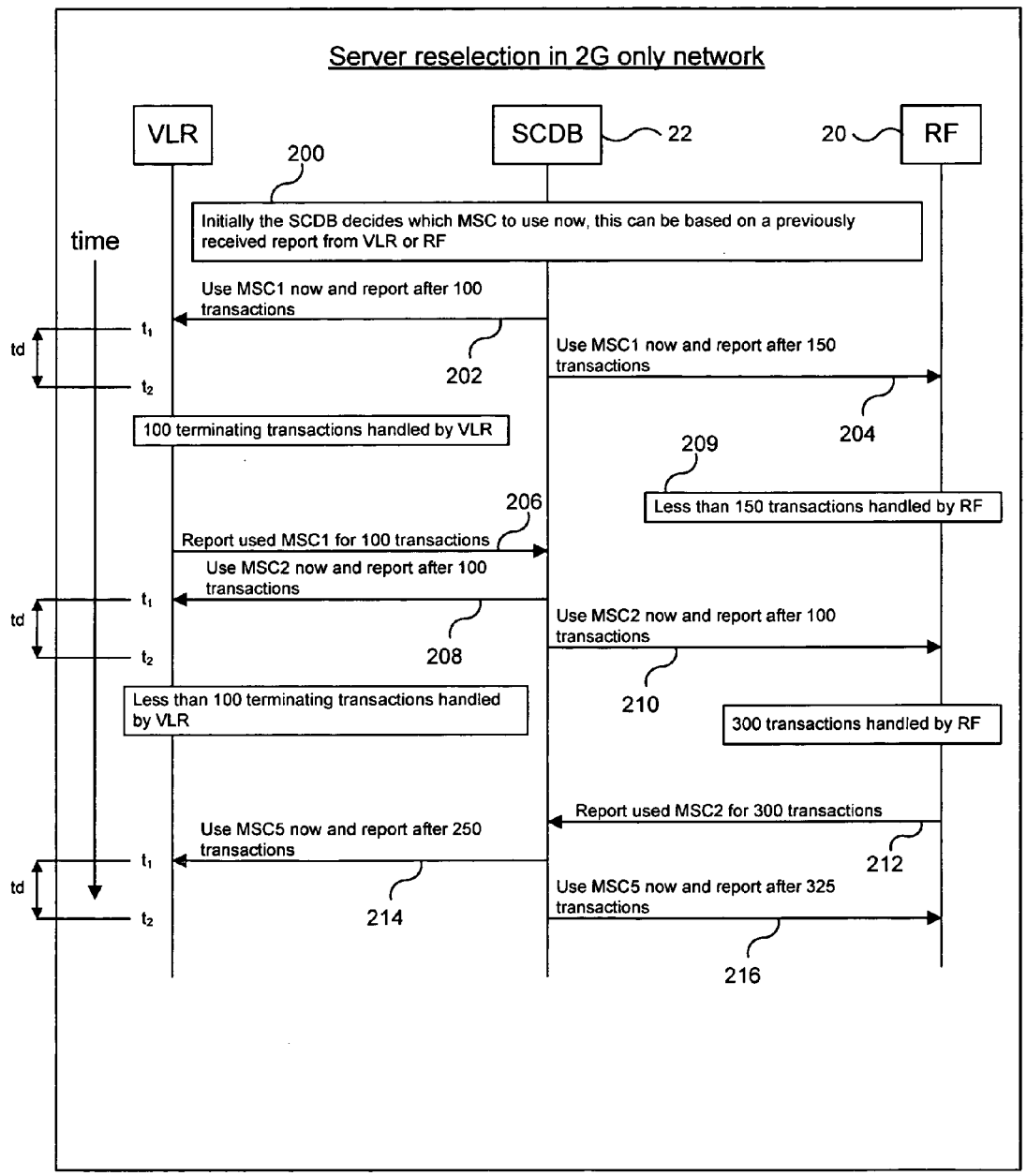
FIG. 2 is a process diagram of method steps of the invention practiced in a second generation (2G) mobile telecommunications network.

Referring now to FIG. 2, an example of a method of the invention in a 2G telecommunications network having a switch pool is shown. The invention uses a "handling switch", further described below, to control or handle corresponding queries and responses. At the top of FIG. 2, in step 200, it is given that the SCDB 22 performs a handling MSC selection function. The handling MSC selection function could be performed for a variety of reasons, some of which will appear in further examples below. The trigger for this particular selection is not important to the understanding of this description, but serves merely as a starting point for FIG. 2. Although this example is shown in the context of a GSM network, the invention may be implemented in other telecommunications networks having a switch pool.

In order to understand the use of the invention in a GSM network utilizing a switch pool, it is important to be cognizant of the separate functions of the VLRs and MSCs. A Visitor Location Register (VLR) contains selected administrative information necessary for call control and services for each MS currently located in the geographic area controlled by the VLR. In general, the VLR is implemented together with the MSC, so that the geographical area controlled by the MSC corresponds to that controlled by the VLR, although each can be implemented as an independent unit. Generally, a network requires multiple VLRs. It should be noted that the MSC contains no information about particular MSs or their locations, this information is stored in the VLRs. In the present invention, it is preferred that a single VLR is used for the switch pool. The use of a single VLR helps to provide advantages in efficiency.

Again referring to FIG. 2, in step 202, it is shown that the SCDB 22 instructs a particular VLR to use a particular MSC, in this, case identified as MSC1. In step 204, it can be seen that the SCDB also instructs the RF to use MSC1. The instructions given to both the VLR and RF 20, to use a particular MSC override existing previous instructions concerning which MSC to use. For the purposes of describing the invention the terms "handling switch," or in the case of this example "handling MSC," will be used to refer to a switch designated for use by both the VLR and the access nodes, or in this example, the RF which, in turn, controls the access nodes. The newly identified handling MSC is used immediately upon receipt of the assignment instruction.

An instruction to reselect the MSC is sent first to the VLR (step 202) from the SCDB and then to the RF (step 204). It can be seen that time is represented by the arrow on the left side of FIG. 2, indicating the passage of beginning at the top of the figure and continuing toward the bottom. As indicated by t1, and t2, step 202 precedes step 204 in this example. That is, MSC1 is used as the handling MSC by the VLR before the RF uses MSC1 as the handling MSC. Preferably, the difference between t1 and t2 is equal to or slightly greater than the average time in the network between a paging request and response. By computing such a time delay, indicated by td, and staggering the instructions to the VLR and RF accordingly, the likelihood that responses to outstanding pages will be handled by the wrong switch is greatly reduced. Of course, other delay periods may be used.

As shown, step 202 includes an instruction to the VLR to report to the SCDB after 100 transactions. Additionally, as shown at step 204, the RF is instructed to report to the SCDB after 150 transactions. Thus, a subsequent handling MSC reselection may be made based upon a count of transactions maintained by the VLR and RF. Note that the transaction count maintained by the VLR is higher than the transaction count maintained by the RF. Reassignment of the handling switch may be based upon parameters such as transaction count or traffic load at any node or combination of nodes in the network.

At step 206, the VLR reports after 100 transactions. The SCDB then, preferably based at least in part upon the load on the MSCs in the network, selects a new handling MSC, for example, MSC 2, for use by the VLR, in this instance for the next 200 transactions. A message is accordingly sent to the VLR at t1, in step 208. In step 210, after a time delay td, at t2 a corresponding message is sent to the RF identifying MSC2 for use as the handling switch. Since, in this example, the VLR handled 100 transactions using MSC1 as the handling MSC before the RF was able to report 150 transactions using MSC1 as the handling MSC, the previous instruction to report is disregarded, step 209, and is replaced by the new instruction to the RF, in step 210, to report after 300 additional transactions.

With continued reference to FIG. 2, at step 212, the RF reports on the use of MSC 2 for 300 transactions. The SCDB now selects a new handling MSC in the same manner as described in the immediately preceding paragraph, in this case MSC 5, and first notifies the VLR, in step 214, at t1. At t2, after a suitable delay, td, the RF is informed of the new handling MSC in step 216. In both step 214 and 216, the VLR and RF are again instructed to report after a given number of transactions computed by the SCDB.

Thus, the invention associates querying switches with responsive access nodes. The invention may continue to reassign the handling switch as shown and described, in principle, ad infinitum. It should be understood that the reassignment of the handling switch, or in this case the handling MSC, may be made based not only on the number of transactions reported, but alternatively on elapsed time, network traffic load, or other parameters. Preferably, the SCDB is provided with a criterion or a number of criteria selected by the network operator for determining when to reselect the handling switch.

Figure 3:
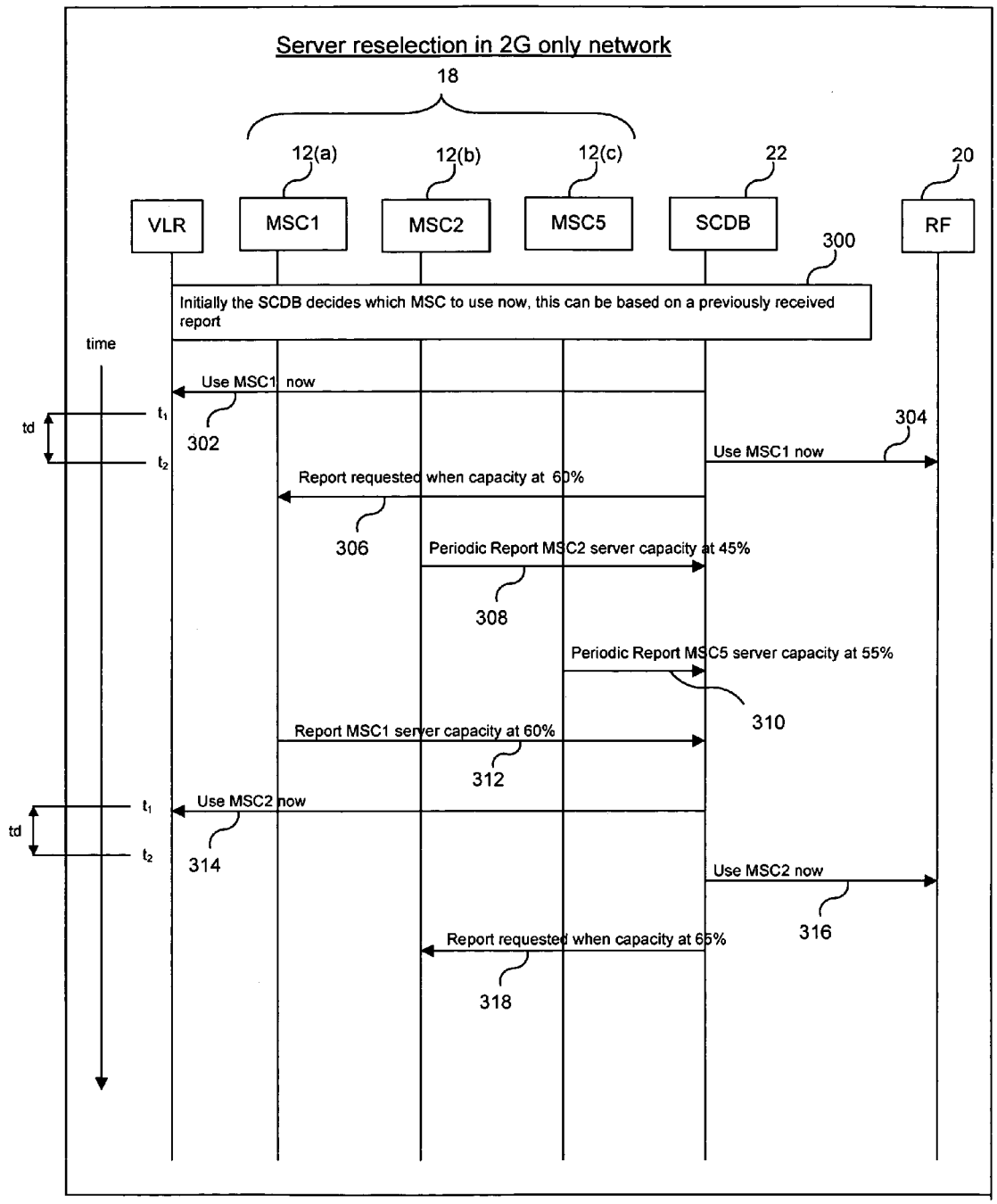
FIG. 3 is a process diagram of the steps of an alternative method of the invention practiced in a 2G mobile telecommunications network.

Referring now to FIG. 3, an alternative example of the operation of the invention is shown. In this example, handling switch reselection is performed based on capacity reports provided to the SCDB by the individual MSCs of the switch pool. At step 300, it has been decided that MSC 1 will be designated the handling MSC. In step 302, the VLR is instructed to use MSC 1 as the handling switch and in step 304, the RF is instructed to use MSC 1. Time is again represented by the arrow on the left side of FIG. 3, showing the passage of time flowing from the top of the figure downward toward the bottom. As indicated by $t_1$ and $t_2$ in FIG. 3, step 302 precedes step 304. Preferably, the distance between $t_1$ and $t_2$ is equal or greater than the average time in the network between a paging request and the corresponding response. The time delay indicated in FIG. 3 by $t_d$ greatly reduces the likelihood that responses to outstanding pages will be handled by the incorrect handling MSC.

In this example of the invention, the SCDB uses reports from the individual switches of the switch pool regarding their network traffic loads. For example, at step 306, MSC1 is instructed to report when it reaches 60% capacity. Additionally, the SCDB may monitor the load on additional nodes in the network, typically switches. For example, MSC2, at step 308, has been instructed to report its load, e.g., 45%. At step 310, MSC5 has also been instructed to report its load, e.g., 55%. In this way, the SCDB may take load distribution among the MSCs into account when reassigning the handling switch. As shown at step 312, MSC1, the handling switch in this example thus far, reports that it has reached 60% capacity. Accordingly, the SCDB instructs the VLR, in step 314, to use MSC2 as the handling MSC at $t_1$. Also, at $t_2$ shown by step 316, after waiting the appropriate time delay ($t_d$), the RF is instructed to use MSC2 as the handling MSC. At step 318, MSC2 is instructed to report when 65% capacity is reached. The outstanding requests for load reports, to MSC5 for example (step 310), may remain outstanding despite the reassignment of the handling MSC. As with the previous; example, many additional iterations of the invention may occur and various instructions and decision-making procedures can be provided at the SCDB in order to perform the handling switch reassignment technique, ensuring that querying switches are associated with responsive nodes.

Figure 4:
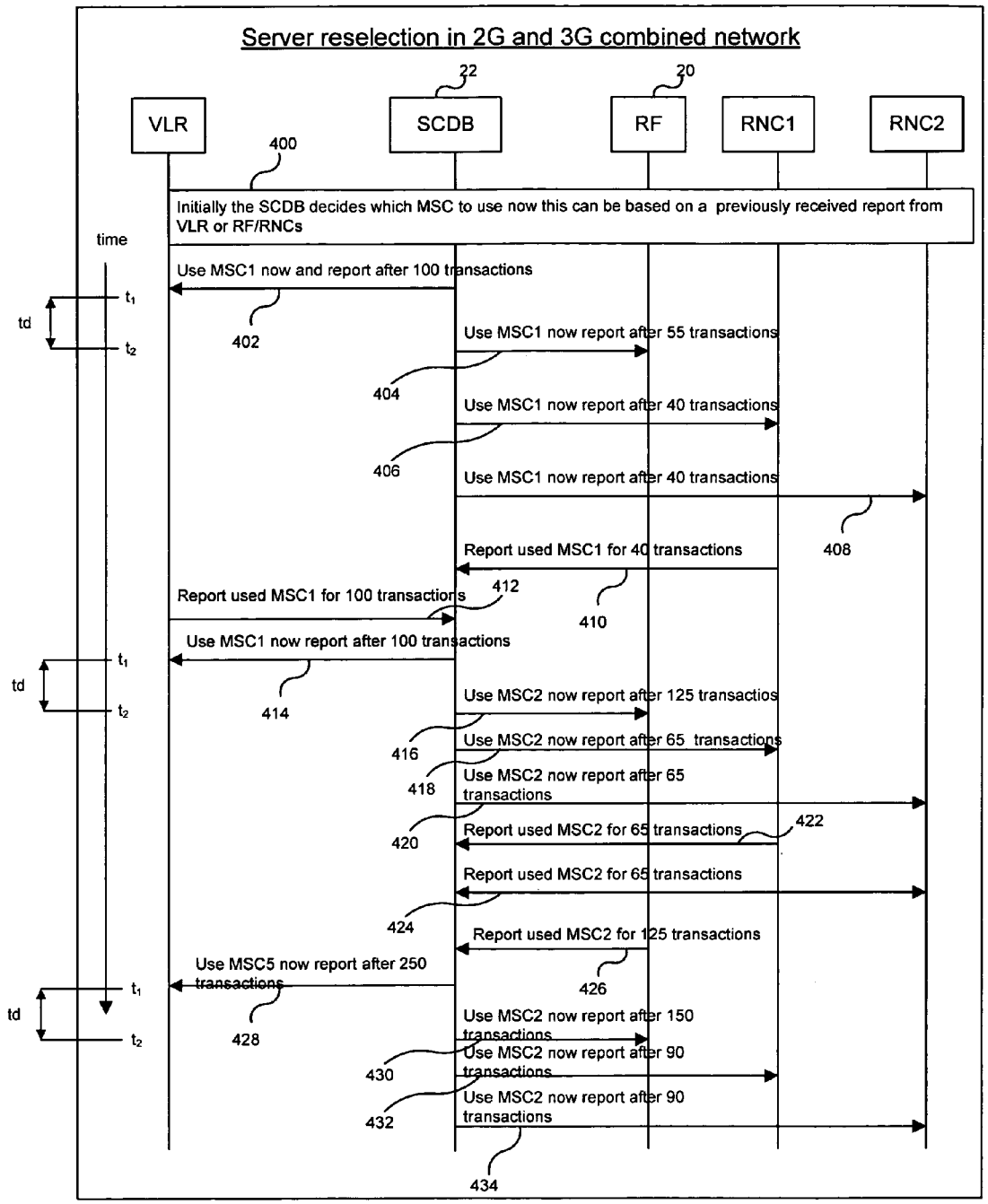
FIG. 4 is a process diagram of method steps of the invention practiced in a combination 2G and third generation (3G) mobile telecommunications network.

An alternative implementation of the invention is shown in FIG. 4, demonstrating the use of the invention in a combined 2G and 3G network. In step 400, for the sake of example, the determination has been made that MSC1 will be used as the current handling MSC. In step 402, an instruction to the VLR to use MSC1 as the handling switch and report after 100 transactions is given at $t_1$. After a suitable delay indicated in FIG. 4 by the $t_d$, the RF is also instructed to use MSC1 as the handling MSC, and report after a total of 75 transactions, step 404. In step 406, the SCDB also instructs Radio Network Controller 1 (RNC1) to use MSC1 as the handling MSC, and to report after 40 transactions. RNC2, in step 408, is also instructed to use MSC1 as the handling MSC, and to report after 40 transactions. It should be understood that steps 404, 406, and 408, may occur simultaneously. It should be noted, however, that it is desirable to maintain the time delay ($t_d$) between the transmission of the new handling MSC assignment from the SCDB to the VLR in step 402, and the transmission of the similar instruction to the access nodes in steps 404, 406, and 408.

As shown at step 410 in this example, RNC1 reports that it has used MSC1 as the handling MSC for 40 transactions. The SCDB 22 is preferably capable of calculating the total number of transactions and/or the total load on the network, and requesting a server reselection when desirable, for example, when the total exceeds some predetermined threshhold. The SCDB 22 preferably may also have a reporting threshhold of each reporting node such as RNC1 in order to prevent overload of any given node in the network. As seen in step 412, the VLR 23 reports that it has used MSC1 as the handling MSC for a total of 100 transactions. In response, in step 414, the SCDB reassigns MSC2 as the handling switch and instructs; the VLR accordingly, requiring a report after 200 transactions. In steps 416, 418 and 420, RF, RNC1, and RNC2, respectively, are instructed of the assignment of MSC2 as the handling MSC, and are further instructed to report after a given transaction count. As in the above example, steps 416, 418, and 420 may occur at the same time. IP multicasting may be used for this purpose. As above, it is preferred that a suitable time delay ($t_d$) intervene between the handling MSC assignment of the VLR and at the access nodes. As can be seen in steps 422, 424, and 426, the RF and individual RNCs may report their transaction counts to the SCDB, triggering the SCDB to perform a handling MSC reselection, step 428. Thus, reassignment of the handling MSC may continue as in steps 430, 432, and 434 repeating the pattern indefinitely.

An additional alternative implementation of the invention is shown in FIG. 5, demonstrating the use of the invention in a combined 2G and 3G network, with reassignment of the handling switch influenced by capacity reports from the switches of the switch pool 18. For the purpose of this example, in step 500, the determination has been made that MSC1 will be used as the current handling MSC. In step 502, an instruction to the VLR to use MSC1 as the handling switch is given at $t_1$. After a suitable delay indicated by $t_d$, the RF is instructed to use MSC1 as the handling MSC at step 504. In step 506, the SCDB also instructs RNC1 to use MSC1 as the handling MSC. In step 508, RNC2 is also instructed to use MSC1 as the handling MSC. It should be understood that steps 504, 506, and 508, may be taken simultaneously. As in the previous examples, is desirable to maintain a time delay ($t_d$) between the transmission of the new handling MSC assignment from the SCDB to the VLR in step 502, and the transmission of similar instructions to the access nodes in steps 504, 506, and 508.

As shown at step 510 of this example, the handling MSC, MSC1, is instructed to report upon reaching 60% of capacity. The SCDB may instruct the switches of the switch pool to report at periodic intervals concerning their operational status, such as load levels. In step 512, MSC2 reports that it is at 45% capacity, and at step 514, MSC5 reports operating at 55% capacity. In this manner, the SCDB may monitor the distribution of the network traffic among the switches of the switch pool. Preferably, the SCDB includes functionality for taking load distribution into account when assigning the handling switch.

In step 516, the MSC1 reports that it has reached 60% capacity. In step 518, the SCDB reassigns MSC2, having a lesser load at present, as the handling switch and instructs the VLR accordingly. After a delay, $t_d$, in steps 520, 522, and 524; RF, RNC1, and RNC2, respectively, are instructed of the assignment of MSC2 as the handling switch. Of course, steps 520, 522, and 524 may occur at the same time. As can be seen in step 526, the new handling switch, MSC2, is instructed to report upon reaching 65% capacity. Preferably, the SCDB will continue to reassign the handling switch in order to efficiently distribute the load in the network and maintain an association between querying switches and responding access nodes.

The embodiments shown and described above are only exemplary. Even though numerous characteristics and advantages of the present invention have been set forth in the foregoing description together with details of the invention, the disclosure is illustrative only and changes may be made within the principles of the invention to the full extent indicated by the broad general meaning of the terms used in the attached claims.

We claim:

1. In a telecommunications network including a switch pool and a plurality of access nodes served by the switch pool, a method of associating a querying switch with a responsive access node comprising the steps of:

assigning a first switch of the switch pool to be a handling switch for queries received from the plurality of access nodes, wherein each query seeks a response from a particular target access node;

the handling switch directing the queries to the plurality of access nodes of the network for the purpose of eliciting responses from respective target access nodes;

the handling switch receiving query responses from target access nodes;

computing an average time interval between a query and corresponding response on the network, and using a time greater than or equal to the average time as the waiting time interval and assigning a subsequent switch of the switch pool as the handling switch and de-assigning the first switch.

2. The method of claim 1 wherein one or both of the assigning steps further comprise the steps of:

notifying querying access nodes of the assignment of a particular switch of the switch pool as a handling switch;

waiting the time interval; and subsequently notifying responding access nodes of the assignment of a particular switch of the switch pool as a handling switch.

3. The method of claim 1 further comprising the steps of counting handling switch transactions and assigning a subsequent switch of the switch pool as the handling switch on the basis of the count.

4. The method of claim 1 further comprising the steps of monitoring the load level and assigning a subsequent switch of the switch pool as the handling switch of the basis of the load level.

5. The method of claim 1 comprising the steps of monitoring the time elapsed since assignment of the handling switch and assigning a subsequent switch of the switch pool as the handling switch on the basis of the elapsed time.

6. The method of claim 1 further comprising the step of, after assigning a subsequent switch of the switch pool as the handling switch, forwarding outstanding query responses to the first handling switch.

7. In a Global System for Mobile Communications (GSM) network including a Mobile Switching Center pool (MSC pool) and a plurality of Base Station Controllers (BSCs) served by the MSC pool, a method of associating a querying MSC with a responding BSC, comprising the steps of:

assigning a first MSC of the MSC pool to be a handling MSC for queries received from the plurality of BSCs, wherein each query seeks a response from a particular BSC;

the handling MSC directing the queries to the BSCs of the network for the purpose of eliciting responses from respective target BSCs;

computing an average time interval between a query and corresponding response on the network, and using a time greater than or equal to the average time as the waiting time interval the handling MSC receiving query responses from target BSCs; and assigning a second MSC of the MSC pool as the handling MSC and de-assigning the first MSC.

8. The method of claim 7 wherein the assigning step further comprises the steps of:
notifying querying BSCs of the assignment of a particular MSC of the MSC pool as a handling MSC;
waiting the time interval; and subsequently
notifying responding BSCs of the assignment of a particular MSC of the MSC pool as a handling MSC.

9. The method of claim 7 further comprising the steps of counting handling MSC transactions and assigning a second MSC of the MSC pool as the handling MSC on the basis of the count.

10. The method of claim 7 further comprising the steps of monitoring the load level and reassigning a different MSC of the MSC pool as the handling MSC of the basis of the load level.

11. The method of claim 7 further comprising the steps of monitoring the time elapsed since assignment of the handling MSC and assigning a second MSC of the MSC pool as the handling MSC on the basis of the elapsed time.

12. The method of claim 7 further comprising the step of, after reassigning a second MSC of the MSC pool as the handling MSC, forwarding outstanding query responses to the first MSC.

13. A telecommunications system comprising:
a Mobile Switching Center pool (MSC pool), said MSC pool further comprising a plurality of individual MSCs;
a plurality of access nodes operably coupled to the MSC pool; and
a Routing Function (RF) adapted for associating a querying MSC with a responding access node, wherein said RF is adapted for:
assigning a first MSC of the switch pool to be a handling MSC for queries received from the plurality of access nodess, wherein each query seeks a response from a particular access node;
the handling MSC directing the queries to the access nodes of the network for the purpose of eliciting responses from respective target access nodes;
the handling MSC receiving query responses from target access nodes;
computing an average time interval between a query and corresponding response on the network, and using a time greater than or equal to the average time as the waiting time interval; and
assigning a second MSC of the MSC pool as the handling MSC and de-assigning the first MSC.

14. The system of claim 13 further comprising a Switch Selection Database (SSDB) operably connected with the RF.

15. The system of claim 13 further comprising a designated handling MSC for receiving and responding to queries received from one or more access nodes.

16. The system of claim 13 further comprising means for redesignating a different MSC of the MSC pool as the handling MSC.

17. The system of claim 13 further comprising a Global System for Mobile Communications (GSM).

* * * * *